United States Patent [19]

Ridenour

[11] Patent Number: 5,553,602
[45] Date of Patent: Sep. 10, 1996

[54] HEAT-DISSIPATING EXTENDER

[75] Inventor: Ralph G. Ridenour, Mansfield, Ohio

[73] Assignee: Universal Enterprises, Inc., Mansfield, Ohio

[21] Appl. No.: 552,829

[22] Filed: Nov. 3, 1995

[51] Int. Cl.[6] .................................................. F24C 3/00
[52] U.S. Cl. ........................ 126/91 A; 431/346; 165/47
[58] Field of Search ............................... 126/91 A, 403,
126/404, 91 R, 229, 407, 414, 409, 248;
431/354, 344, 139, 346; 285/354, 41, 334.5;
165/134.1, 47; 123/541

[56] References Cited

U.S. PATENT DOCUMENTS

| | | | |
|---|---|---|---|
| 2,410,881 | 11/1946 | Hunter | 126/91 A |
| 2,524,158 | 10/1950 | Briskin | 126/91 A |
| 2,744,809 | 5/1956 | Falligant | 431/344 |
| 2,799,522 | 7/1957 | King et al. | |
| 2,840,350 | 6/1958 | Pierce . | |
| 3,226,138 | 12/1965 | Ellis | 285/334.5 |
| 3,294,425 | 12/1966 | Franck | 285/334.5 |
| 4,128,264 | 12/1978 | Oldford . | |
| 4,154,446 | 5/1979 | Usry . | |
| 4,323,268 | 4/1982 | Wilson . | |
| 4,405,160 | 9/1983 | Tyuuman . | |
| 4,871,199 | 10/1989 | Ridenour et al. | 285/382.5 |
| 5,083,916 | 1/1992 | Glennon et al. | 431/344 |

*Primary Examiner*—James C. Yeung
*Attorney, Agent, or Firm*—Pearne, Gordon, McCoy & Granger

[57] ABSTRACT

A heat-dissipating extender is provided in a joint between a sealed-gas burner having a burner fitting and a gas supply tube having a tube fitting. The heat-dissipating extender includes a body having a first end, a second end, and an interior passage extending between the first end and the second end for passage of the gas from the tube to the burner. The first end has a first fitting interfitting with the burner fitting to provide a seal against leakage of fluid pressure. The second end has a second fitting interfitting with the tube fitting to provide a seal against leakage of fluid pressure. The body is adapted for dissipating heat to provide a substantial temperature differential between the first end and the second end when heat is applied to the burner fitting at the first end during operation of the burner so that the tube connection at the second end remains sealed. The extender is formed from a material having a low thermal conductivity such as stainless steel and has a plurality of grooves to form radially extending ribs.

20 Claims, 2 Drawing Sheets

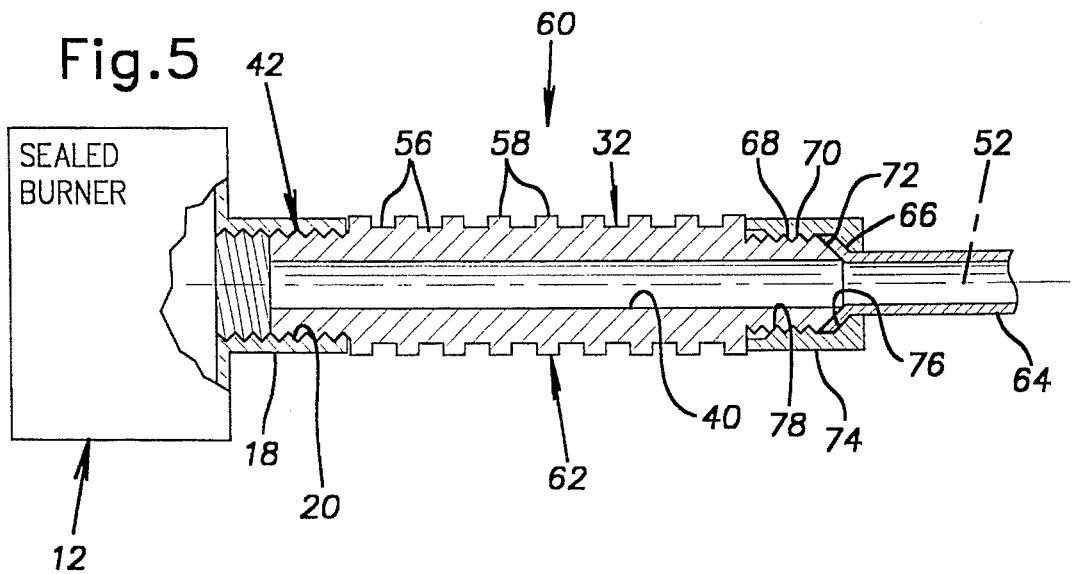
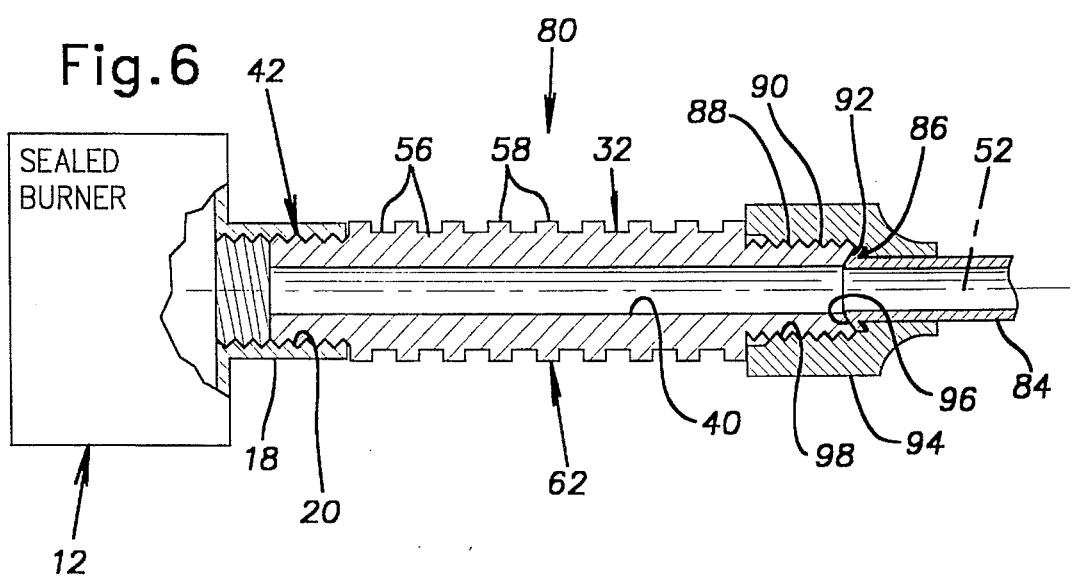

5,553,602

HEAT-DISSIPATING EXTENDER

BACKGROUND OF THE INVENTION

1. Field of the Invention

The present invention relates to tube connections for gas-burners and, more particularly, to tube connections having heat dissipating extenders so that the tube connections remain sealed during operation of high-temperature burners.

2. Description of Related Art

Tube connections or fittings are known which provide a fluid tight seal and permit many disassemblies and reassemblies. A first type of tube-fitting commonly used is one wherein a nut is slipped over the end of the tubing and then a sleeve with two conically tapered ends is slipped over the end of the tube. The tube end is then inserted in a second coupling member which has an annular lateral shoulder at about a 45 degree angle to the tube axis. The nut also has a 45 degree angle shoulder. The two shoulders axially compress the conical sleeve to provide a seal between the sleeve and the tube.

A second type of tube-fitting assembly is a single-bead or double-bead tube-fitting. U.S. Pat. No. 4,871,199, which is expressly incorporated herein in its entirety by reference, discloses a double-bead tube-fitting. With this type of tube-fitting the conical sleeve of the first type of tube-fitting is replaced by one or more beads formed in the tube. Lateral shoulders on first and second fittings compress the beads to provide a seal between the beads and the fittings.

Each type of tube-fitting, however, may fail under relatively high temperatures. For example, gas tubing connected directly to some sealed-gas burners of a gas stove may fail if the burner at the tube fitting connection exceeds a certain temperature. Some sealed burners may reach temperatures of up to and over 500 degrees Fahrenheit. At this temperature leaks may occur because the tube or tube-fittings relax and break the seal. Accordingly, there is a need in the art for a joint between a gas burner which operates at relatively high temperatures and a gas supply tube that remains sealed during operation of the burner.

SUMMARY OF THE INVENTION

The present invention provides a heat-dissipating extender for a joint connecting a high-temperature burner having a burner fitting to a gas supply tube having a tube fitting. The heat-dissipating extender overcomes the above-described problems of the related art by substantially blocking heat produced by the burner from reaching the tube fitting. The heat-dissipating extender includes a body having a first end, a second end, and an interior passage extending between the first end and the second end for communicating the burner with the tube. The first end has a first extender fitting adapted for interfitting with the burner fitting to provide a seal against leakage of fluid pressure. The second end has a second extender fitting adapted for interfitting with the tube fitting to provide a seal against leakage of fluid pressure. The body also includes means for dissipating heat to provide a substantial temperature differential between the first end and the second end of the body when heat is applied to the first end during operation of the burner. In preferred embodiments the heat dissipating means includes a lower thermal conductivity material for the body and grooves in an outer surface of the body which form radially extending ribs or fins.

BRIEF DESCRIPTION OF THE DRAWINGS

These and further features of the present invention will be apparent with reference to the following description and drawings, wherein:

FIG. 5 is an elevational view, in cross section, of a variation of the joint of FIG. 1; and FIG. 6 is an elevational view, in cross section, of another variation of the joint of FIG. 1.

DETAILED DESCRIPTION OF THE PREFERRED EMBODIMENT

Figure 1:
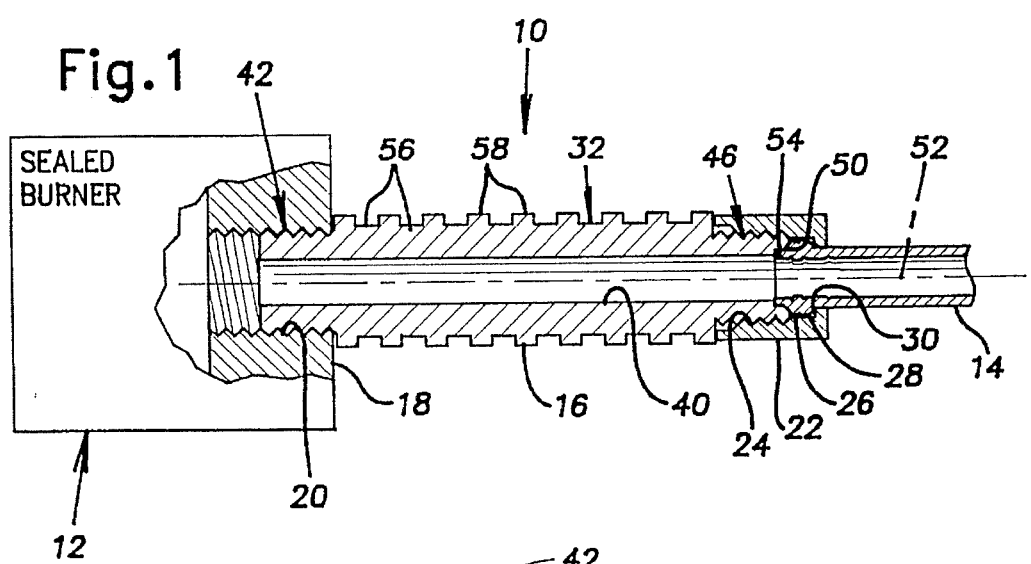
FIG. 1 is an elevational view, in cross-section, of a joint having a heat-dissipating extender between a sealed-gas burner and a gas supply tube according to the invention.

FIG. 1 illustrates a joint 10 between a sealed-gas burner 12 and a tube 14 connected to a gas source (not shown) having a heat dissipating extender 16 according to the invention between the burner 12 and the tube 14. The burner 12 has a fitting 18 adapted for mating with the extender 16 to form a gas-tight seal between the burner 12 and the extender 16. The fitting 18 has internal or "female" threads 20. It is noted that the sealed-gas burner 12 can alternatively be any high-temperature burner, that is, a burner reaching temperatures which cause gas supply tube-fittings to leak.

The tube 14 also has a nut or fitting 22 which is adapted for mating with the extender 16 to form a gas-tight seal between the tube 14 and the extender 16. The fitting 22 of the illustrated embodiment has internal or "female" threads 24. The tube fitting 22 of the illustrated embodiment is a double-bead-type fitting wherein the tube 14 has a pair of annular beads 26, 28 and the fitting 22 has a lateral shoulder 30. The beads 26, 28 are axially compressed between the lateral shoulder 30 and the extender 16 so that the seal is formed between the forward bead 26 and the extender 16. The large extent to which the deformed areas may be axially compressed assures a good fluid tight seal despite a variable amount of torque which may be applied. See, for example, U.S. Pat. No. 4,871,199 for further details of a double-bead-type fitting.

Figure 2:
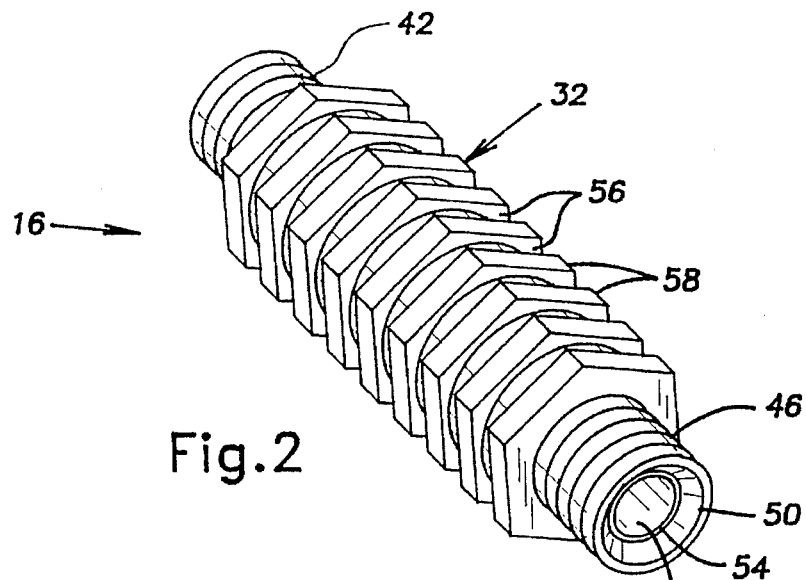
FIG. 2. is a perspective view of the heat dissipating extender of FIG. 1.
Figure 3:
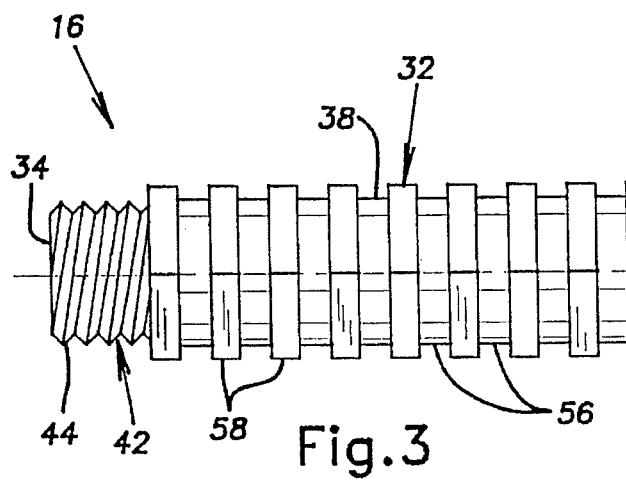
FIG. 3 is a side elevational view of the heat dissipating extender of FIG. 1.
Figure 4:
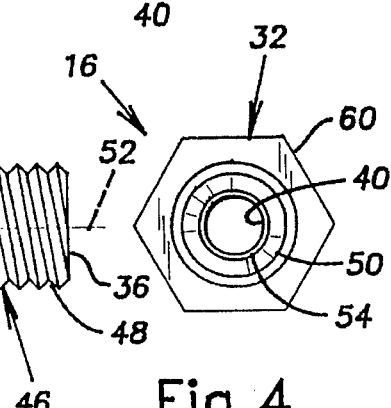
FIG. 4 is an end elevational view of the heat dissipating extender of FIG. 1.

As best shown in FIGS. 2–4, the extender 16 includes a generally tubularly-shaped body 32 having a forward or first end portion 34, a rearward or second end portion 36, and a central portion 38. The extender 16 has a longitudinally extending interior passage 40 between the first end 34 and the second end 36. The first end portion 34 includes a fitting 42 adapted to interfit with the fitting 18 of the burner 12 to provide a seal against leakage of fluid pressure at temperatures up to at least the operating temperatures of the burner 12. The fitting 42 of the illustrated embodiment has external or "male" threads 44. It is noted that the female and male threads 20, 44 of the fittings 18, 42 could be reversed or other types of fittings could be alternatively utilized such as, for example, a press seal fitting.

The second end portion 36 also includes a fitting 46 adapted to interfit with the tube 14 and the tube fitting 22 to provide a seal against leakage of fluid pressure. The fitting 46 of the illustrated embodiment has external or "male" threads 48. The fitting 46 has a lateral shoulder 50 which is typically at a 45-degree angle relative to a central axis 52 for engaging the forward bead 26 to establish the seal. The fitting 46 also typically has a shoulder 54 as a stop for forward advancing movement of the tube 14. It is noted that the female and male threads 24, 48 of the fittings 22, 46 could be reversed or other types of tube fittings could alternatively be used such as, for example, a flare fitting, a single bead fitting, a brass nut and sleeve, or a LOXITS fitting.

The extender 16 is adapted for dissipating heat to enable the second end portion 36 of the extender 16 to remain at a temperature below a failure temperature of the tube connection, that is, a temperature at which the gas-tight seal between the extender 16 and the tube 14 is no longer maintained. The extender 16 is preferably adapted to enable the second end portion 36 to remain below the failure temperature when the burner fitting 18 reaches a maximum temperature, which for some gas-sealed burners may be at least 500 degrees Fahrenheit. During operation of the burner 12, heat produced by the burner 12 elevates the temperature of the burner fitting 18 and a substantial temperature differential is obtained between the first end portion at the burner fitting 18 and the second end portion at the tube fitting 22 due to dissipation of the heat by the extender 16. The extender 16 substantially blocks the heat at the burner connection from reaching the tube connection.

The extender 16 is adapted to dissipate heat by proper selection of, for example, the material of the extender 16, the length of the extender 16, the amount of surface area of extender 16, the surface finish of the extender 16. The selections are governed by the amount of heat to be dissipated (which is governed by the operating temperature of the burner and the failure temperature of the tube connection), the temperature of the surrounding atmosphere, and the temperature of the gas flowing through the joint 10.

Means for dissipating the heat preferably includes forming the extender 16 from a material having a relatively low thermal conductivity to reduce conduction of the heat from the first end 34 at the burner 12 to the second end 36 at the tube fitting to keep the heat away from the tube connection. The material preferably has a thermal conductivity (k, Watts/Meter-degree centigrade) of less than about 150 such as for example brass, more preferably of less than about 100 such as for example some stainless steels, and most preferably of less than about 50 such as for example other stainless steels.

The means for dissipating the heat also preferably includes an increased surface area on the body 32. An outer surface of the body 32 of the illustrated embodiment is provided with a plurality of axially-spaced grooves 56 which extend about the circumference of the body 32. The grooves 56 form a plurality of axially-spaced fins or ribs 58 which outwardly extend in a radial direction. The ribs 58 increase the surface area of the body 32 to improve heat transfer from the extender 16 to the surrounding environment. The size and number of ribs are selected according to the heat dissipation requirements of the extender 16.

The extender 16 is also provided with means 60 for interthreading and torquing the threaded fittings 18, 22, 42, 46 for installation and removal of the extender 16. Preferably, at least a portion of the outer periphery of the body 32 is hexagonally-shaped in cross-section to provide a wrenching surface. As best shown in FIG. 4, the ribs of the illustrated embodiment are hexagonally-shaped. It is noted that other shapes could be utilized and other means for torquing the fittings 18, 22, 42, 46 could be utilized.

FIG. 5 illustrates a joint 60 which is similar to the joint 10 of FIG. 1 except that the tube connection is a flare-type fitting rather than a double-bead-type fitting. FIG. 5 uses like reference numerals for like structure. The joint 60 illustrates how the heat dissipating extender 16 of FIG. 1 can be adapted for other types of tube connections. The joint 60 includes a heat dissipating extender 62 between the burner 12 and a tube 64 having a flare 66. The second end portion of the extender 62 has a fitting 68 with external or "male" threads 70 and an angled lateral surface 72. The tube 64 has a nut or fitting 74 which has an angled lateral surface 76 for engaging the flare 66 of the tube 64 and internal or "female" threads 78. The fitting 74 is adapted for mating with the fitting 68 of the extender 62. As the fittings 68, 74 are interthreaded, the lateral surface 76 of the tube fitting 74 engages the flare 66 of the tube 64 to form a gas-tight seal between the flare 66 of the tube 64 and the lateral surface 72 of the extender fitting 68. It is noted that the female and male threads 78, 70 of the fittings 74, 68 could be reversed or other types of tube fittings could alternatively be used such as, for example, a single bead fitting, a brass nut and sleeve, or a LOXITS fitting.

FIG. 6 illustrates a joint 80 which is similar to the joint 10 of FIG. 1 except that the tube connection is an inverted-flare rather than a double-bead. FIG. 6 uses like reference numerals for like structure. The joint 80 includes a heat dissipating extender 82 between the burner 12 and a tube 84 having an inverted-flare 86. The second end portion of the extender 82 has a fitting 88 with external or "male" threads 90 and an angled lateral surface 92. The tube 84 has a nut or fitting 94 which has an angled lateral surface 96 for engaging the inverted-flare 86 of the tube 84 and internal or "female" threads 98. The fitting 94 is adapted for mating with the fitting 88 of the extender 82. As the fittings 88, 94 are interthreaded, the lateral surface 96 of the tube fitting 94 engages the flare 86 of the tube 84 to form a gas-tight seal between the flare 86 of the tube 84 and the lateral surface 92 of the extender fitting 88. It is noted that the female and male threads 78, 70 of the fittings 74, 68 could be reversed.

Although particular embodiments of the invention have been described in detail, it will be understood that the invention is not limited correspondingly in scope, but includes all changes and modifications coming within the spirit and terms of the claims appended hereto.

What is claimed is:

1. A joint comprising:

a high-temperature gas burner having a burner fitting;

a tube for supplying gas to the burner having a tube fitting; and a heat-dissipating extender including a body having a first end and a second end, an interior passage extending between said first end and said second end for communicating the gas from said tube to said burner, a first extender fitting at said first end interfitting with said burner fitting to provide a seal against leakage of fluid pressure, and a second extender fitting at said second end interfitting with said tube fitting to provide a seal against leakage of fluid pressure, wherein said body is adapted for providing a substantial temperature differential between said first end and said second end during operation of said burner such that the seal provided by said second extender fitting and said tube fitting is maintained against leakage.

2. The joint according to claim 1, wherein said burner is a sealed-gas burner which operates at temperatures of at least about 500 degrees Fahrenheit.

3. The joint according to claim 1, wherein said extender comprises a material having a low thermal conductivity.

4. The joint according to claim 1, wherein said extender comprises stainless steel.

5. The joint according to claim 1, wherein said extender comprises brass.

6. The joint according to claim 1, wherein said extender has a plurality of grooves in an outer surface forming radially extending ribs.

7. The joint according to claim 1, wherein said tube has a double bead, said tube fitting is a double-bead-tube fitting, and said second extender fitting is a double-bead-tube fitting.

8. The joint according to claim 1, wherein said tube has a flare, said tube fitting is a flare-tube fitting, and said second extender fitting is a flare-tube fitting.

9. A tube assembly for connecting a sealed-gas burner having a burner fitting to a gas supply, said tube assembly comprising:

a tube;

a tube fitting having an opening therethrough, said tube extending through said opening; and a heat dissipating extender including a body having an a first end and a second end, an interior passage extending between said first end and said second end, a first extender fitting at said first end for interfitting with the burner fitting, and a second extender fitting at said second end for interfitting with said tube fitting to connect said tube to said extender and provide a seal against leakage of fluid pressure, wherein said body is adapted for providing a substantial temperature differential between said first end and said second end of said body during operation of the burner such that the seal provided by said second extender fitting and said tube fitting is maintainable against leakage.

10. The tube assembly according to claim 9, wherein said extender comprises a material having a low thermal conductivity.

11. The tube assembly according to claim 9, wherein said extender comprises stainless steel.

12. The tube assembly according to claim 9, wherein said extender comprises brass.

13. The tube assembly according to claim 9, wherein said extender has a plurality of grooves in an outer surface forming radially extending ribs.

14. The tube assembly according to claim 9, wherein said tube has a double bead, said tube fitting is a double-bead-tube fitting, and said second extender fitting is a double-bead-tube fitting.

15. The tube assembly according to claim 9, wherein said tube has a flare, said tube fitting is a flare-tube fitting, and said second extender fitting is a flare-tube fitting.

16. A heat-dissipating extender for connecting a high-temperature gas burner having a burner fitting to a gas supply tube having a tube fitting, said heat-dissipating extender comprising:

a body having an a first end and a second end;

an interior passage extending between said first end and said second end for communicating gas from the tube to the burner;

a first extender fitting at said first end adapted for interfitting with the burner fitting to provide a seal against leakage of fluid pressure;

a second extender fitting at said second end adapted for interfitting with the tube fitting to provide a seal against leakage of fluid pressure; and wherein said body includes means for dissipating heat to provide a substantial temperature differential between said first end and said second end of said body when heat is applied to said first end during operation of the burner.

17. The heat-dissipating extender according to claim 16, wherein said body includes a material having a low thermal conductivity.

18. The heat-dissipating extender according to claim 16, wherein said body comprises stainless steel.

19. The heat-dissipating extender according to claim 16, wherein said extender has a plurality of grooves in an outer surface forming radially extending ribs.

20. The heat-dissipating extender according to claim 16, wherein said body has an outer surface hexagonally-shaped in cross-section.

* * * * *